May 4, 1948. T. P. CHASE 2,441,008
WHEEL COVER
Filed Dec. 13, 1946

Inventor
Theron P. Chase

By
Spencer, Willits, Helwig & Baillio
Attorneys

Patented May 4, 1948

2,441,008

UNITED STATES PATENT OFFICE 2,441,008

WHEEL COVER

Theron P. Chase, Huntington Woods, Mich., assignor to General Motors Corporation, Detroit, Mich., a corporation of Delaware Application December 13, 1946, Serial No. 715,927

4 Claims. (Cl. 301—37)

This invention relates to wheel brakes for vehicles and more particularly to cooling means associated with the wheel and brakes.

One object of the invention is to provide an ornamental and readily detachable wheel cover including means whereby cooling air is forceably delivered on to wheel and wheel braking means to dissipate the heat therefrom.

The combined means whereby the above object and others are accomplished will become apparent by reference to the following detailed description and drawings illustrating one form of the invention.

Figures 1, 2:
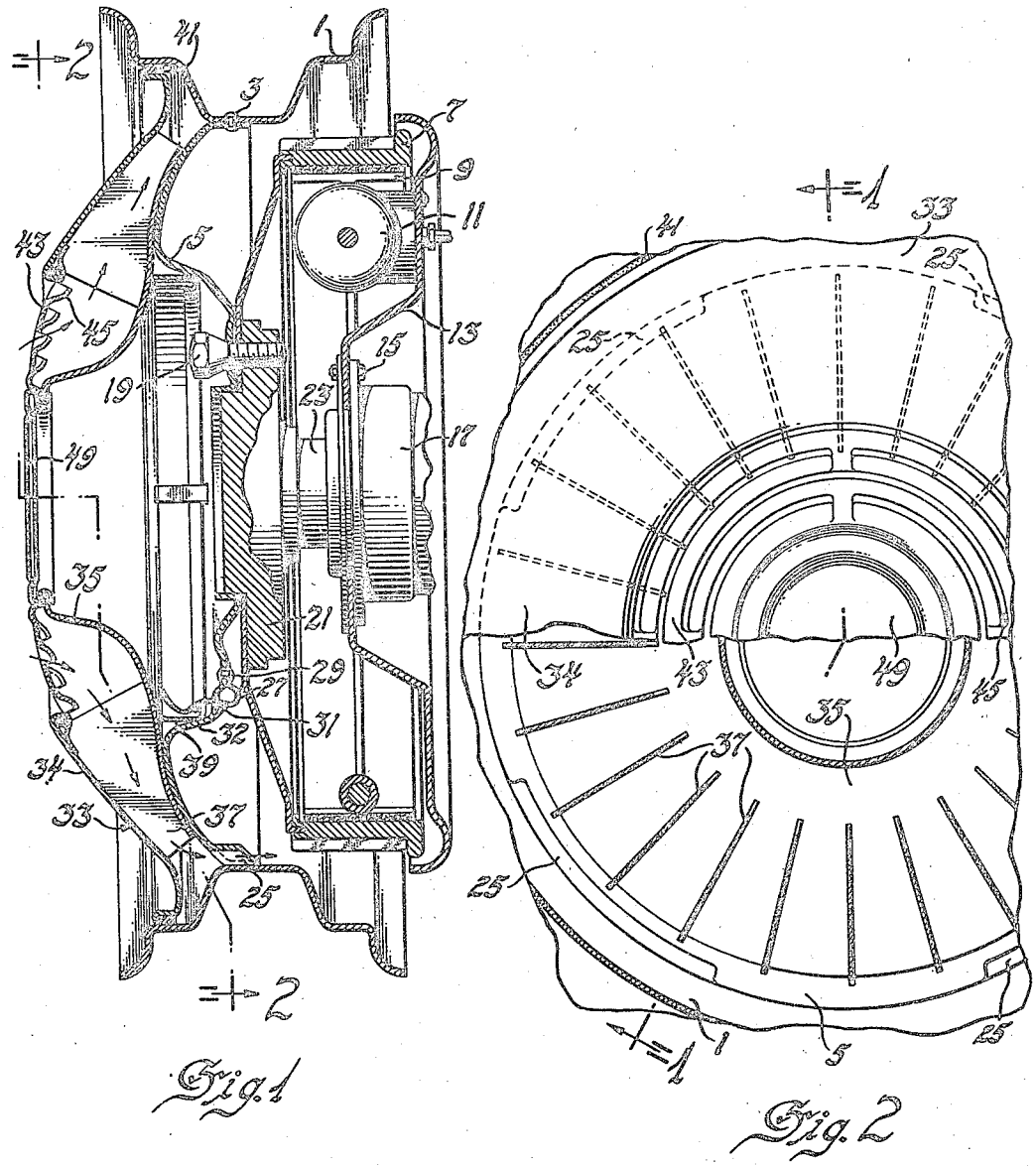
Figure 1 is a transverse sectional view of a vehicle wheel and braking mechanism provided with my novel wheel cover.
Figure 2 is a vertical elevational view with parts broken away and in section, taken on line 2—2 of Figure 1.

As best illustrated in Figure 1 of the drawing, the numeral 1 designates a wheel rim secured by fastening means 3 to wheel disk 5 of dished shape. The wheel disk 5 encloses a brake drum 7 in which are brake shoes 9 and a brake cylinder 11, including pistons for moving the shoes into frictional engagement with the internal surface of the drum in conventional manner. The brake shoes 9, cylinder 11 and means for moving the shoes into engagement with the drum are supported on a brake backing plate 13 secured to bolts 15 on a stationary axle housing 17. The wheel disk 5 and brake drum 13 are secured by studs 19 to the hub portion 21 of an axle shaft 23 rotatably supported in concentric relation within the axle housing 17 on an antifriction bearing, not shown, in conventional manner.

The wheel disk 5 is provided with a plurality of openings 25 in the periphery adjacent the rim 1 alongside the periphery of the brake drum 7. A plurality of resilient attachment clips 27 are shown secured in concentric relation by rivets 29 to the inside face of the wheel disk 5 and are shown extending outwardly through openings 31 therein adjacent the inner face of an outwardly extending intermediate portion 32 of the wheel disk 5. The attachment clips 27 of the wheel disk 5 serve to attach a wheel cover indicated generally at 33 and render it readily detachable therefrom.

The wheel cover 33 is essentially a rotor of a centrifugal fan in form, and comprises axially spaced disks 34—35 of annular form converging radially outwardly from the center and having vanes 37 secured radially therebetween. The outer extremity of the inner cover disk 35 is formed so that it conforms to the outer surface of the wheel disk 5 within the boundaries of the peripheral openings 25 therein and a flanged ring 39 is secured in concentric relation to the inside wheel cover disk 35 for detachable locking engagement with the resilient attaching means on the wheel disk 5 and also for peripheral contact with the inner surface of the outwardly extending flange portion 32 of the wheel disk 5.

The periphery of the outer cover disk 34 is flanged and a gasket 41 surrounds this flanged portion and engages the internal surface of the wheel rim 1 when the wheel cover 33 is attached to the wheel disk 5 and consequently the cover is retained in concentric relation on the wheel but is readily detachable therefrom.

It will be noted that the inner peripheries of the inner and outer cover disks 34—35 are concentrically disposed and are secured together by a suitable decorative grille 43 of annular form having arcuate louvers 45 formed therein serving as air openings for easy entrance of cooling air into the space between the cover disks 34—35 between which the radial vanes 37 are secured. It will be evident that upon rotation of the wheel cover 34 with the wheel the vanes 37 force the air centrifugally outwardly of the space between the cover disks 34—35 which are formed at their outer extremities to direct the air axially outwardly through the peripheral openings 25 in the wheel disk 5 and axially between the internal surface of the wheel rim 1 and external surface of the brake drum 9 to cool these surfaces.

The central circular opening of the wheel cover is closed by a suitable medallion plate 49 of circular form secured at its periphery to the inner periphery of the grille 43 and the outer cover disk 34 to form the decorative hub portion of the wheel cover. If desired the annular outer cover disk 34 may be of bright metal or the outer surface painted white to further improve the appearance of the wheel cover which also serves as a centrifugal cooling fan for the wheel and braking means.

I claim:

1. In combination, a wheel disk having peripheral openings, a rim portion secured thereto, a brake drum secured to one side of said disk, a wheel cover secured to the other side of said disk, said cover comprising inner and outer disks with radial vanes secured therebetween, said outer disk having a central air opening and in engagement with said rim whereby said cover serves to circulate cooling air through said openings in said disk on to said brake drum upon rotation of said wheel and cover.

2. In combination, a wheel comprising a central perforated portion having cover attaching means and a rim secured thereto, braking means secured to said central wheel portion, a wheel cover comprising outer and inner annular disks and radial vanes secured therebetween, means on said inner annular disk adapted to be releasably engaged with said cover attaching means to hold said outer annular disk in contact with said wheel rim and said inner annular disk in contact with said central perforated wheel portion for directing cooling air therethrough and on to said braking means.

3. In combination, a dished wheel disk having a rim, said wheel having openings therethrough adjacent said rim, a brake drum secured to the interior portion of said wheel and a wheel cover detachably secured to the exterior portion of said wheel, said cover comprising an inner disk adjacent the central portion of said wheel, an outer disk having a central opening and in peripheral engagement with said rim, and radial vanes secured between said disks to draw air in the central opening of said outer disk and discharge the air outwardly through the peripheral wheel openings on to said brake drum upon rotation of said wheel.

4. In combination, a wheel having a central portion with openings therethrough, a rim and braking means secured therethrough, attaching means secured to said central wheel portion, an ornamental wheel cover comprising inner and outer annular disks, radial vanes secured between said disks, attaching means on said inner annular disk adapted to be releasably engaged with said attaching means on said wheel for holding said outer annular disk in contact with said rim and said inner annular disk in contact with the central portion of said wheel, a medallion plate closing the central opening of said inner annular disk and an annular louvered plate closing the space between said medallion plate and the central opening of said outer annular disk whereby air is drawn through said louvered plate and forcibly ejected by said vanes through the openings in said central wheel portion on to said braking means upon rotation of said wheel.

THERON P. CHASE.